Patented June 30, 1953

2,643,965

UNITED STATES PATENT OFFICE 2,643,965

NEW CHEMICALS AND FUNGICIDAL COMPOSITIONS CONTAINING SAME

George E. O'Brien, New Haven, Adelaide Bornmann, Bethany, and Allen E. Smith, Oxford, Conn., assignors to United States Rubber Company, New York, N. Y., a corporation of New Jersey No Drawing. Application November 2, 1951, Serial No. 254,632

11 Claims. (Cl. 167—30)

This invention relates to new and useful improvements in new chemicals and fungicidal compositions containing same.

We have found that N-(p-chlorophenyl)-o-nitrobenzamide and the N-methyl homologue, viz., N-methyl, N-(p-chlorophenyl)-o-nitrobenzamide are extremely effective as seed protectants and disinfectants for fungicidal control of seedborne diseases.

The N - (p - chlorophenyl) - o - nitrobenzamide and the N-methyl homologue are new chemicals having, respectively, the structural formulae

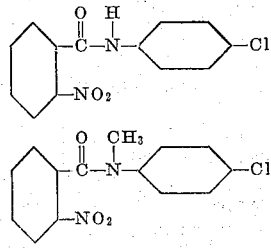

The meta- and para-nitro isomers of N-(p-chlorophenyl) - o - nitrobenzamide, viz., N - (p - chlorophenyl)-m-nitrobenzamide and N-(p-chlorophenyl)-p-nitrobenzamide are known compounds, see vanHorsen, "Rev. Trav. Chim.," vol. 55, pp. 247–258 (1936) and Jadhav et al., "Chemical Abstracts," vol. 34, p. 2818 (1940), but they are ineffective as seed protectants as will be shown below.

The N - (p - chlorophenyl) -o- nitrobenzamide and N-methyl, N-(p-chlorophenyl)-o-nitrobenzamide may be prepared by reacting p-chloroaniline and N-methyl p-chloraniline, respectively, with o-nitrobenzoyl chloride as in the following illustrative examples:

Preparation of o-nitrobenzoyl chloride. A mixture of thionyl chloride (100 grams, 0.83 mole) and o-nitrobenzoic acid, M. P. 139–43° (45 grams, 0.27 mole) was refluxed 2 hours. The excess thionyl chloride was distilled off and 50 cc. of dry benzene was added, which was then distilled at 30 mm. to aid in removing the last traces of thionyl chloride. The product, crude o-nitrobenzoyl chloride, weighed 45 grams.

Preparation of N-(p-chlorophenyl)-o-nitrobenzamide. A colorless aqueous solution of p-chloroaniline hydrochloride (31.0 grams, 0.19 mole) was treated with the o-nitrobenzoyl chloride prepared above (35 grams, about 0.19 mole). Aqueous 6 N sodium hydroxide was added in portions, with shaking, to keep the reaction mixture basic. After 35 minutes the product was collected. Yield, 44 grams (84%) of crude N-(p-chlorophenyl) - o - nitrobenzamide. Crystallization from alcohol gave 20 grams of colorless crystals, M. P. 182–3° C. Analysis for $C_{13}H_9O_3N_2Cl$: per cent N, calculated 10.1%, found 9.8%; per cent Cl, calculated 12.8%; found 13.0%. A second crop (11 grams) of crystals of N-(p-chlorophenyl)-o-nitrobenzamide (M. P. 182–183° C.) were obtained on diluting the filtrate from the alcohol crystallization of the 20 gram fraction with water. The analytical data above and the biological data below were obtained on the 20 gram fraction.

Preparation of N-methyl, N-(p-chlorophenyl)-o-nitrobenzamide. In a three-neck flask, fitted with a stirrer and dropping funnel, a solution of o-nitrobenzoyl chloride prepared as above (15 grams, 0.08 mole) in 31 grams of benzene was treated with a solution of N-methyl p-chloroaniline (22.8 grams; 0.16 mole) in 62 grams of benzene. The reaction mixture was stirred for one-half hour after dropwise addition of the N-methyl p-chloroaniline was complete. The benzene solution was then washed with hot water, hydrochloric acid (1N), sodium hydroxide (1N), and finally with water. Concentration of the benzene layer gave the product which was recrystallized from ligroin. Yield, 15.3 grams, M. P. 104–106° C. Analysis: per cent Cl, calculated 12.2%; found 12.5%.

Example I

The effectiveness of the N-(p-chlorophenyl)-o-nitrobenzamide and the ineffectiveness of the meta- and paranitro isomers as seed disinfectants are shown in the following tests:

Infected barley seeds are treated with 1% of the seed weight of each of the chemicals: N-(p-chlorophenyl) - o - nitrobenzamide, N-(p-chlorophenyl)-m-nitrobenzamide, and N-(p-chlorophenyl)-p-nitrobenzamide in the following manner: A 10 gram sample of barley seed, known to be entirely infected with *Helminthosporium sativum*, the seedborne blight disease of barley, is placed in a wide mouth 2 oz. jar. The chemical to be tested is ground uniformly in a mortar to fine particle size for seed treatment. 100 mg. of test chemical is weighed on an analytical balance and added to the jar containing the infected seed. The jar cover is lined with glazed paper then screwed down. The jar containing the chemical plus seed is then shaken vigorously for 30 seconds to accomplish initial distribution of the test chemical on the seed. To complete seed treatment and insure even distribution of the chemical over the seed, the jar is placed on a seed treatment wheel and slowly rotated for 30 minutes.

Twenty-five seeds from each of the three chemical treatments as above are planted in ordinary soil in one row of an 8 row flat. The planted seeds are lightly covered with soil and each flat is uniformly watered with one liter of tap water. A large number of replicates of untreated seeds are also similarly planted. The planted flats are placed in the greenhouse to await plant emergence.

Above 10 days after planting, emerged seedlings approximately 3 inches in height are carefully removed from the soil and scored for both emergence and disease control. At this stage of seedling growth the disease is observed most frequently on the coleoptile of the plants. The more severely infected seedlings have dark brown lesions near the soil line. Lesions occasionally extend into the leaf blade. Disease ratings are given with reference to the number of emerged seedlings. Thus, if out of one group of the 25 seed planted 20 seedlings emerge, 15 of which are clean (free from disease) and 5 infected with disease, the test chemical will be rated as having given 75% disease control and 80% germination.

In the above tests, the untreated (check) seeds showed 78% germination with only 13% of the emerged seedlings disease free, i. e. 87% of the emerged seedlings were diseased. The N-(p-chlorophenyl)-o-nitrobenzamide of the present invention at 1% of the seed weight gave 92% germination and 78% disease control of emerged seedlings. The N - (p - chlorophenyl) - m - nitrobenzamide (metanitro isomer of the chemical of the present invention) at 1% of the seed weight gave 76% germination with only 16% control of emerged seedlings. The N-(p-chlorophenyl)-p-nitrobenzamide (paranitro isomer of the chemical of the present invention) at 1% of the seed weight gave 76% germination with only 11% disease control of emerged seedlings.

Further tests similar to the above with the N - (p - chlorophenyl) - o - nitrobenzamide of the present invention at reduced dosages show that the effectiveness of the chemical is not appreciably decreased as a seed disinfectant for infected barley seed to as low dosages as 0.015% by weight of the barley seed. For example, the tests showed 80% germination and 80% disease control of emerged seedlings at 0.45%, 0.15% and 0.05% of the chemical based on the seed weight. At 0.015% of the seed weight, the tests showed 71% emergence and 76% disease control of emerged seedlings. At 0.005% of the seed weight the test showed 80% emergence and 44% disease control of emerged seedlings.

Example II

In infected barley seed tests similar to Example I with N-methyl, N-(p-chlorophenyl)-o-nitrobenzamide, 1% of the seed weight of the chemical 12 days after planting showed 96% germination with 96% disease control of the emerged seedlings. The untreated (check) seeds showed 79% germination with only 14% disease control of the emerged seedlings, i. e. 86% of the emerged seedlings were diseased.

In other tests with 0.45%, 0.15% and 0.05% of the N-methyl, N-(p-chlorophenyl)-o-nitrobenzamide based on the weight of the infected barley seed, the 0.45% dosage gave 99% germination and 85% disease control, the 0.15% dosage gave 97% germination and 85% control, the 0.05% dosage gave 97% germination and 68% disease control, whereas the untreated (check) seeds gave 84% germination and only 6% disease control.

Example III

The effectiveness of the N-(p-chlorophenyl)-o-nitrobenzamide as a foliage fungicide is shown in the following test:

Uniform sized tomato plants of the variety Bonney Best (4 to 6 inches tall) were sprayed with an aqueous suspension containing 2000 p. p. m. of N-(p-chlorophenyl)-o-nitrobenzamide. The aqueous suspension of the compound contained 1 part by weight of a commercial surface-active agent "Nacconal NR" (a sodium alkyl aryl sulfonate) per 100 parts of the N-(p-chlorophenyl)-o-nitrobenzamide. The spray deposit was allowed to dry on the foliage. The plants together with untreated (check) plants, were uniformly inoculated by spraying onto the foliage an aqueous suspension of spores of *Alternaria solani*, the fungus responsible for a serious blight disease of the tomato. The plants were then placed in a chamber at 75° F., and 100% humidity for twenty hours, after which they were removed to normal greenhouse conditions. Sixty hours later the effectiveness of the chemical was determined by comparing the blight lesions on the treated plants with check plants which were not treated with the chemical. The check plants showed an average of 210 blight lesions, whereas the number of lesions on the plants treated with a dosage of 2000 p. p. m. of N-(p-chlorophenyl)-o-nitrobenzamide was 50.

Example IV

Tomato plants (6 to 8 inches tall) were treated similarly to Example III with an aqueous suspension of 2000 p. p. m. of N-methyl, N-(p-chlorophenyl)-o-nitrobenzamide and then with the aqueous suspension of spores of *Alternaria solani*. Three days after the spore inoculation, the plants treated with the N-methyl, N-(p-chlorophenyl)-o-nitrobenzamide showed an average of 16 blight lesions, whereas the check plants not treated with the chemical showed an average of 358 lesions.

The N-(p-chlorophenyl)-o-nitrobenzamide or its N-methyl homologue may be used in other conventional manners of fungicide application for control of other types of plant infesting fungi. It may be used to protect healthy seed and to disinfect diseased seed. In seed treatment, it may be applied to the seeds by tumbling with the chemical alone as shown in the examples above, or with the chemical admixed with a powdered solid carrier, such as the various mineral silicates, e. g. mica, talc, pyrophillite, and clays. It may also be applied to the seeds in admixture with a conventional surface-active dispersing agent, with or without additional powdered solid carrier, as by first wetting the mixture with a small amount of water and then tumbling the seeds in the slurry. It may be applied as a liquid or spray in a liquid carrier, as in solution in a suitable solvent, or suspended in a suitable non-solvent, for example, water. In foliage treatment, the N-(p-chlorophenyl)-o-nitrobenzamide or its N-methyl homologue may be applied to the plants by spraying with an aqueous suspension of the chemical containing a surface-active dispersing agent. The N-(p-chlorophenyl)-o-nitrobenzamide or its N-methyl homologue may be admixed with powdered solid carriers, such as mineral silicates, together with small amounts of a dispersing agent so that a wettable powder is obtained which may be applied directly to loci to be protected against fungi, or which may be shaken up with water, to form a suspension of the chemical (and powdered carrier) in water for application in that form. The chemical may be applied to foliage and other loci to be protected against fungi by the aerosol method. Solutions for the aerosol treatment may be prepared by dissolving the chemical directly in the aerosol carrier which is liquid under pressure but which is a gas at ordinary temperature (e. g. 20° C.) and atmospheric pressure, or the aerosol solution may be prepared by first dissolving the chemical in a less volatile solvent and then admixing such solution with the highly volatile liquid aerosol carrier. The chemical of the present invention may be used admixed with carriers that active of themselves, for example, other fungicides or bactericides, in secticides, insectifuges, fertilizers or hormones.

Having thus described our invention, what we claim and desire to protect by Letters Patent is:

1. A chemical selected from the group consisting of N-(p-chlorophenyl)-o-nitrobenzamide and N-methyl, N-(p-chlorophenyl)-o-nitrobenzamide.

2. N-(p-chlorophenyl)-o-nitrobenzamide.

3. N-methyl, N-(p-chlorophenyl)-o-nitrobenzamide.

4. A fungicidal composition comprising N-(p-chlorophenyl)-o-nitrobenzamide and a liquid carrier therefor.

5. A fungicidal composition comprising N-(p-chlorophenyl)-o-nitrobenzamide and a powdered solid carrier therefor.

6. A fungicidal composition comprising N-(p-chlorophenyl)-o-nitrobenzamide and a surface-active dispersing agent.

7. A fungicidal composition comprising an aqueous suspension of N-(p-chlorophenyl)-o-nitrobenzamide, said composition containing a dispersing agent.

8. A fungicidal composition comprising N-methyl, N-(p-chlorophenyl)-o-nitrobenzamide and a liquid carrier therefor.

9. A fungicidal composition comprising N-methyl, N-(p-chlorophenyl)-o-nitrobenzamide and a powdered solid carrier therefor.

10. A fungicidal composition comprising N-methyl, N-(p-chlorophenyl)-o-nitrobenzamide and a surface-active dispersing agent.

11. A fungicidal composition comprising an aqueous suspension of N-methyl, N-(p-chlorophenyl)-o-nitrobenzamide, said composition containing a dispersing agent.

GEORGE E. O'BRIEN.
ADELAIDE BORNMANN.
ALLEN E. SMITH.

References Cited in the file of this patent

Siegler et al., Journal Economic Entomology, volume 41, Number 4, August 1948, pages 658, 659.